United States Patent
Neal

(10) Patent No.: US 7,067,952 B2
(45) Date of Patent: Jun. 27, 2006

(54) STATOR ASSEMBLY MADE FROM A MOLDED WEB OF CORE SEGMENTS AND MOTOR USING SAME

(75) Inventor: Griffith D. Neal, Alameda, CA (US)

(73) Assignee: Encap Motor Corporation, Alameda, CA (US)

( * ) Notice: Subject to any disclaimer, the term of this patent is extended or adjusted under 35 U.S.C. 154(b) by 248 days.

(21) Appl. No.: 10/383,219

(22) Filed: Mar. 5, 2003

(65) Prior Publication Data

US 2004/0034988 A1 Feb. 26, 2004

Related U.S. Application Data

(63) Continuation-in-part of application No. 09/798,511, filed on Mar. 2, 2001, now Pat. No. 7,036,207.

(51) Int. Cl.
*H02K 1/18* (2006.01)
*H02K 15/02* (2006.01)
*H02K 15/10* (2006.01)

(52) U.S. Cl. ............ 310/259; 310/42; 310/45; 310/218

(58) Field of Classification Search ......... 310/42–43, 310/45, 216–218, 254, 259; 244/432, 433, 244/433.4; 29/596
See application file for complete search history.

(56) References Cited

U.S. PATENT DOCUMENTS

| | | | |
|---|---|---|---|
| 2,607,816 A * | 8/1952 | Ryder et al. ............ | 310/42 |
| 3,348,302 A * | 10/1967 | Foerster ................. | 29/605 |
| 3,590,328 A | 6/1971 | Frescura | |
| 3,638,055 A | 1/1972 | Zimmermann | |
| 3,802,066 A | 4/1974 | Barrett | |
| 3,827,141 A * | 8/1974 | Hallerback ............. | 29/596 |
| 3,874,073 A | 4/1975 | Dochterman et al. | |
| 3,908,138 A | 9/1975 | Shieh | |
| 3,942,054 A | 3/1976 | Kristen et al. | |
| 3,979,530 A | 9/1976 | Schwider et al. | |
| 4,015,154 A * | 3/1977 | Tanaka et al. ............ | 310/42 |
| 4,128,527 A | 12/1978 | Kinjo et al. | |
| 4,173,822 A | 11/1979 | Futterer et al. | |
| 4,352,897 A | 10/1982 | Ogata et al. | |
| 4,365,180 A | 12/1982 | Licata et al. | |
| 4,372,035 A | 2/1983 | McMillen | |

(Continued)

FOREIGN PATENT DOCUMENTS

BE 870878 1/1979

(Continued)

OTHER PUBLICATIONS

LNP Engineering Plastics, Advertisment entitled "Konduit™ Thermally Conductive Composites," undated (2 pages).

(Continued)

*Primary Examiner*—Burton Mullins
(74) *Attorney, Agent, or Firm*—Steven P. Shurtz; Brinks Hofer Gilson & Lione

(57) ABSTRACT

A plurality of stator arc segments 20 are linked together by a phase change material 22 enabling simplified winding and higher slot fill. Once wound this continuous structure can be formed into a toroidal core 17 for a stator assembly 40 used to make a motor 100. In a preferred embodiment, a monolithic body 42 of phase change material substantially encapsulates the conductors and holds the stator arc segments 20 in contact with each other in the toroidal core 17. Hard disc drives using the motor 100, and methods of constructing the motor 100 are also disclosed.

14 Claims, 5 Drawing Sheets

U.S. PATENT DOCUMENTS

| | | | |
|---|---|---|---|
| 4,387,311 A | 6/1983 | Kobayashi et al. | |
| 4,492,889 A | 1/1985 | Fukushi et al. | |
| 4,572,979 A | 2/1986 | Haar et al. | |
| 4,643,346 A | 2/1987 | Gotoh | |
| 4,679,313 A | 7/1987 | Schultz et al. | |
| 4,712,035 A | 12/1987 | Forbes et al. | |
| 4,760,299 A | 7/1988 | Dickie et al. | |
| 4,801,833 A | 1/1989 | Dye | |
| 4,818,911 A * | 4/1989 | Taguchi et al. | 310/259 |
| 4,853,576 A | 8/1989 | Mayumi et al. | |
| 4,858,073 A | 8/1989 | Gregory | |
| 4,868,970 A | 9/1989 | Schultz et al. | |
| 4,954,739 A | 9/1990 | Schultz et al. | |
| 4,990,809 A | 2/1991 | Artus et al. | |
| 5,008,572 A | 4/1991 | Marshall et al. | |
| 5,036,580 A | 8/1991 | Fox et al. | |
| 5,073,735 A | 12/1991 | Takagi | |
| 5,075,585 A | 12/1991 | Teruyama et al. | |
| 5,121,021 A | 6/1992 | Ward | |
| 5,134,327 A | 7/1992 | Sumi et al. | |
| 5,142,103 A | 8/1992 | Stine | |
| 5,147,982 A | 9/1992 | Steffen | |
| 5,191,698 A | 3/1993 | Sumi et al. | |
| 5,206,554 A | 4/1993 | Perrot | |
| 5,268,607 A | 12/1993 | McManus | |
| 5,334,897 A | 8/1994 | Ineson et al. | |
| 5,345,129 A | 9/1994 | Molnar | |
| 5,382,852 A | 1/1995 | Yuhi et al. | |
| 5,396,210 A | 3/1995 | Purohit et al. | |
| 5,400,218 A | 3/1995 | Val | |
| 5,414,317 A | 5/1995 | Reid et al. | |
| 5,459,190 A | 10/1995 | Nakamura et al. | |
| 5,461,772 A | 10/1995 | Puri | |
| 5,500,780 A | 3/1996 | Boutaghou et al. | |
| 5,506,458 A | 4/1996 | Pace et al. | |
| 5,541,787 A | 7/1996 | Jabbari et al. | |
| 5,548,458 A | 8/1996 | Pelstring et al. | |
| 5,558,445 A | 9/1996 | Chen et al. | |
| 5,579,188 A | 11/1996 | Dunfield et al. | |
| 5,587,617 A | 12/1996 | Dunfield et al. | |
| 5,592,731 A | 1/1997 | Huang et al. | |
| 5,598,048 A | 1/1997 | Dunfield et al. | |
| 5,610,463 A | 3/1997 | Dunfield et al. | |
| 5,619,083 A | 4/1997 | Dunfield et al. | |
| 5,619,389 A | 4/1997 | Dunfield et al. | |
| 5,621,372 A | 4/1997 | Purohit | |
| 5,633,545 A | 5/1997 | Albrecht et al. | |
| 5,666,242 A | 9/1997 | Edwards et al. | |
| 5,668,427 A | 9/1997 | Morita | |
| 5,672,927 A | 9/1997 | Viskochil | |
| 5,675,196 A | 10/1997 | Huang et al. | |
| 5,694,268 A | 12/1997 | Dunfield et al. | |
| 5,698,919 A | 12/1997 | Obara | |
| 5,728,600 A | 3/1998 | Saxelby, Jr. et al. | |
| 5,729,072 A | 3/1998 | Hirano et al. | |
| 5,729,404 A | 3/1998 | Dunfield et al. | |
| 5,742,450 A | 4/1998 | Moser | |
| 5,751,085 A | 5/1998 | Hayashi | |
| 5,751,514 A | 5/1998 | Hyde et al. | |
| 5,766,535 A | 6/1998 | Ong | |
| 5,783,888 A | 7/1998 | Yamano | |
| 5,806,169 A | 9/1998 | Trago et al. | |
| 5,814,412 A | 9/1998 | Terada et al. | |
| 5,850,318 A | 12/1998 | Dunfield et al. | |
| 5,859,486 A | 1/1999 | Nakahara et al. | |
| 5,875,540 A | 3/1999 | Sargeant et al. | |
| 5,880,179 A | 3/1999 | Ito et al. | |
| 5,881,447 A | 3/1999 | Molnar | |
| 5,898,252 A | 4/1999 | Tanaka et al. | |
| 5,918,360 A | 7/1999 | Forbes et al. | |
| 5,942,824 A | 8/1999 | Shioya et al. | |
| 5,949,172 A | 9/1999 | Katagiri | |
| 5,958,466 A | 9/1999 | Ong | |
| 5,973,424 A | 10/1999 | Engelberger et al. | |
| 5,982,057 A | 11/1999 | Imada et al. | |
| 5,986,365 A | 11/1999 | Kuwert et al. | |
| 5,986,377 A | 11/1999 | Yamada et al. | |
| 5,990,247 A | 11/1999 | Terada et al. | |
| 6,002,185 A | 12/1999 | Nakao et al. | |
| 6,019,516 A | 2/2000 | Leuthold et al. | |
| 6,020,661 A | 2/2000 | Trago et al. | |
| 6,034,841 A | 3/2000 | Albrecht et al. | |
| 6,043,583 A | 3/2000 | Kurosawa et al. | |
| 6,049,153 A | 4/2000 | Nishiyama et al. | |
| 6,071,014 A | 6/2000 | Lee et al. | |
| 6,075,304 A | 6/2000 | Nakatsuka | |
| 6,081,059 A * | 6/2000 | Hsu | 310/179 |
| 6,111,334 A * | 8/2000 | Horski et al. | 310/254 |
| 6,153,959 A | 11/2000 | Lorenzo | |
| 6,163,952 A | 12/2000 | Takehara | |
| 6,167,610 B1 | 1/2001 | Nakahara et al. | |
| 6,201,334 B1 | 3/2001 | Sargeant et al. | |
| 6,265,800 B1 | 7/2001 | Kimura et al. | |
| 6,265,804 B1 | 7/2001 | Nitta et al. | |
| 6,300,695 B1 | 10/2001 | Neal | |
| 6,362,554 B1 | 3/2002 | Neal | |
| 6,437,464 B1 | 8/2002 | Neal | |
| 6,501,616 B1 | 12/2002 | Neal | |
| 6,617,721 B1 | 9/2003 | Neal | |
| 6,658,721 B1 * | 12/2003 | Kazama et al. | 29/596 |
| 6,753,628 B1 | 6/2004 | Neal | |
| 6,844,636 B1 | 1/2005 | Lieu et al. | |
| 6,892,439 B1 | 5/2005 | Neal et al. | |
| 6,911,166 B1 | 6/2005 | Neal | |
| 6,941,640 B1 | 9/2005 | Neal et al. | |
| 2003/0081347 A1 | 5/2003 | Neal | |
| 2005/0134124 A1 | 6/2005 | Lieu | |

FOREIGN PATENT DOCUMENTS

| | | |
|---|---|---|
| BE | 891258 | 3/1982 |
| DE | 25 39 492 A1 | 3/1977 |
| EP | 0 747 943 A2 | 12/1996 |
| EP | 0 883 171 A1 | 12/1998 |
| FR | 2 647 958 | 12/1990 |
| JP | 11-38937 * | 8/1988 |
| JP | 04295256 A * | 10/1992 |
| JP | 05336722 | 12/1993 |
| JP | 10070870 | 3/1998 |
| JP | 410271719 | 10/1998 |
| JP | 11082508 | 3/1999 |
| SU | 1334297 | 8/1987 |
| SU | 1494148 | 7/1989 |
| WO | WO 92/06532 | 4/1992 |
| WO | WO 96/20501 | 7/1996 |
| WO | WO 96/33533 | 10/1996 |
| WO | WO 97/39870 | 10/1997 |

OTHER PUBLICATIONS

Product Information from Dupont Engineering Polymers entitled "Electrical/Electronic Thermoplastic Encapsulation," undated, Publ. Reorder No.: H-58633 (R, 96.7), 20 pages.

LNP Engineering Plastics, Press Release entitled "LNP Introduces First-Ever Line of Thermally Conductive Compounds," Jan. 28, 1999 (2 pages).

Buchanan Motor Works, Inc., article from the Internet entitled "Epoxy Seal—Prevents Down Time and Keeps Equipment Running Longer," Jul. 14, 1999, <http://www.bmwworks.com/VIP.htm>, 1 page.

The Epoxylite Corporation, article from the Internet entitled "Vacuum Pressure Impregnation (VPI) Systems", Nov. 19, 1999, <http://www.epoxylite.com/EpoxyliteEquipment.htm>, 3 pages.

Neeltran Inc., article from the Internet entitled "Vacuum Pressure Impregnation (VPI)", Nov. 19, 1999, <http://www.neeltran.thomasregister.com/olc/neeltran/neel9.htm> 2 pages.

* cited by examiner

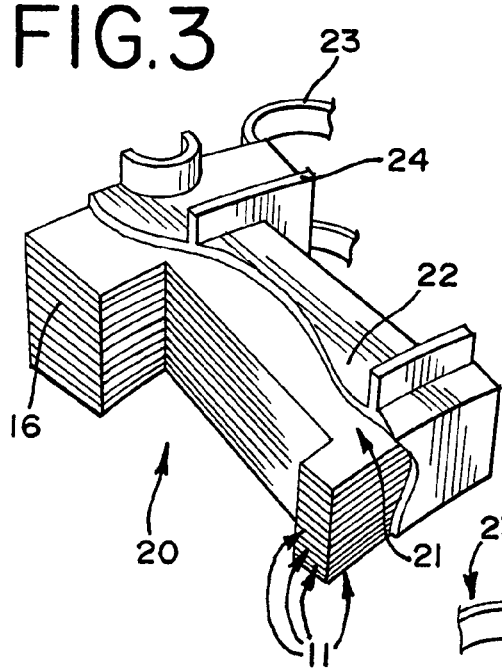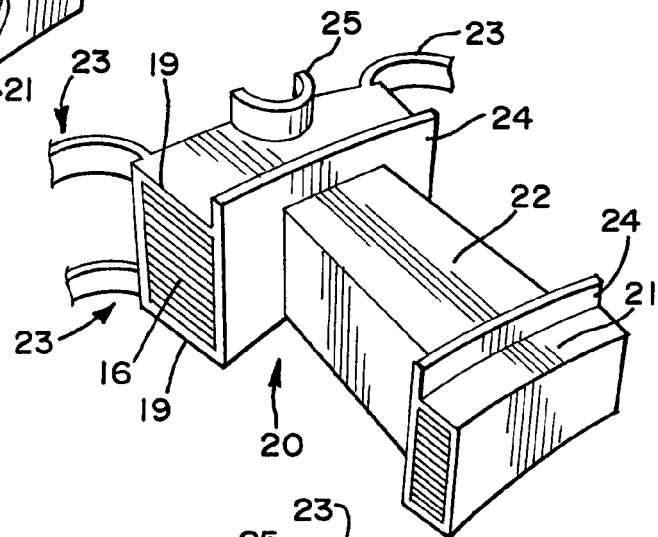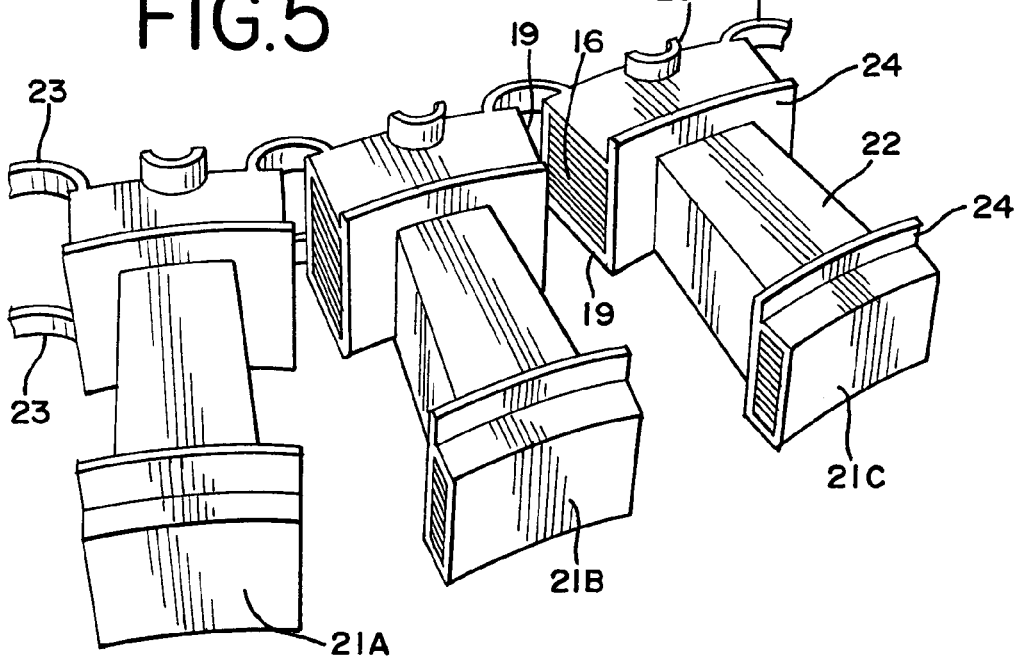

STATOR ASSEMBLY MADE FROM A MOLDED WEB OF CORE SEGMENTS AND MOTOR USING SAME

REFERENCE TO EARLIER FILED APPLICATION

The present application is a continuation-in-part of application Ser. No. 09/798,511, filed Mar. 2, 2001, now U.S. Pat. No. 7,036,207, and entitled Stator Assembly Made From A Plurality Of Toroidal Core Arc Segments And Motor Using Same, which is hereby incorporated by reference.

FIELD OF THE INVENTION

The present invention relates generally to a stator assembly used in a dynamoelectric machine such as a motor or a generator. It relates particularly to a spindle motor such as used in a hard disc drive, and to the construction and arrangement of a stator assembly made from a plurality of arc segments.

BACKGROUND OF THE INVENTION

Computers commonly use disc drives for memory storage purposes. Disc drives include a stack of one or more magnetic discs that rotate and are accessed using a head or read-write transducer. Typically, a high speed motor such as a spindle motor is used to rotate the discs.

In conventional spindle motors, stators have been made by laminating together stamped pieces of steel. These stamped pieces of steel are generally circular in nature, but also have "poles" extending either inwardly or outwardly, depending on whether the rotor is on the inside or surrounds the stator. The stamped pieces are laminated together and then coated with insulation. Wire is then wound around the poles to form stator windings.

An example of a conventional spindle motor 1 is shown in FIG. 1. The motor 1 includes a base 2 which is usually made from die cast aluminum, a stator 4, a shaft 6, bearings 7 and a disc support member 8, also referred to as a hub. A magnet 3 and flux return ring 5 are attached to the disc support member 8. The stator 4 is separated from the base 2 using an insulator (not shown) and attached to the base 2 using a glue. Distinct structures are formed in the base 2 and the disc support member 8 to accommodate the bearings 7. One end of the shaft 6 is inserted into the bearing 7 positioned in the base 2 and the other end of the shaft 6 is placed in the bearing 7 located in the hub 8. A separate electrical connector 9 may also be inserted into the base 2.

Each of these parts must be fixed at predefined tolerances with respect to one another. Accuracy in these tolerances can significantly enhance motor performance.

In operation, the disc stack is placed upon the hub. The stator windings are selectively energized and interact with the permanent magnet to cause a defined rotation of the hub. As hub 8 rotates, the head engages in reading or writing activities based upon instructions from the CPU in the computer.

Manufacturers of disc drives are constantly seeking to improve the speed with which data can be accessed. To an extent, this speed depends upon the efficiency of the spindle motor, as existing magneto-resistive head technology is capable of accessing data at a rate greater than the speed offered by the highest speed spindle motor currently in production. The efficiency of the spindle motor is dependent upon the dimensional consistency or tolerances between the various components of the motor. Greater dimensional consistency between components leads to a smaller gap between the stator 4 and the magnet 3, producing more force, which provides more torque and enables faster acceleration and higher rotational speeds.

The conventional method of forming stators has a number of drawbacks. First, most steel is manufactured in rolled sheets and thus has a grain orientation. The grain orientation has an effect on the magnetic flux properties of the steel. In circular stamped pieces of steel, the grain orientation differs at different points around the circle. Compared from the radius line of the circle, the grain orientation is sometimes aligned along the radius, sometimes transverse to it, and mostly at a varying angle to the radius. The un-aligned grain structure of conventional stators causes the magnetic flux values to differ in parts of the stator, and thus the motor does not have consistent and uniform torque properties as it rotates.

Another drawback with using circular steel pieces is that, especially for inward facing poles, it has been difficult to wind the wire windings tightly because of the cramped space to work inside of the laminated stator core. The cramped working space creates a lower limit on the size of the stator and thus the motor. The limited working space also results in a low packing density of wire. The packing density of wire coiled around the poles affects the amount of power generated by the motor. Increasing packing density increases the power and thus the efficiency of the spindle motor.

An important factor in motor design is to reduce stack up tolerances in the motor. Stack up tolerances reduce the overall dimensional consistency between the components. Stack up tolerances refer to the sum of the variation of all the tolerances of all the parts, as well as the overall tolerance that relates to the alignment of the parts relative to one another. One source of stack up tolerances is from the circular stator body. Generally, the thickness of rolled steel is not uniform across the width of the roll. Sometimes the edges are thicker or thinner than the center. In a stator made from circular stamped pieces, the thicknesses of individual laminations are thus different from one side to the other. When stacked together, this creates a stack up tolerance problem. Furthermore, the circular stampings leave a lot of wasted steel that is removed and must be recycled or discarded.

Another important factor in motor design is the lowering of the operating temperature of the motor. Increased motor temperature affects the electrical efficiency of the motor and bearing life. As temperature increases, resistive loses in wire increase, thereby reducing total motor power. Furthermore, the Arhennius equation predicts that the failure rate of an electrical device is exponentially related to its operating temperature. The frictional heat generated by bearings increases with speed. Also, as bearings get hot they expand, and the bearing cages get stressed and may deflect, causing non-uniform rotation, reducing bearing life. This non-uniform rotation causes a further problem of limiting the ability of the servo system controlling the read/write heads to follow data tracks on the magnetic media. One drawback with existing motor designs is their limited effective dissipation of the heat, and difficulty in incorporating heat sinks to aid in heat dissipation. In addition, in current motors the operating temperatures generally increase as the size of the motor is decreased.

Manufacturers have established strict requirements on the outgassing of materials that are used inside a hard disc drive. These requirements are intended to reduce the emission of materials onto the magnetic media or heads during the operation of the drive. Of primary concern are glues used to attach components together, varnish used to insulate wire, and epoxy used to protect steel laminations from oxidation.

In addition to such outgassed materials, airborne particulate in a drive may lead to head damage. Also, airborne particulates in the disc drive could interfere with signal transfer between the read/write head and the media. To reduce the effects of potential airborne particulate, hard drives are manufactured to exacting clean room standards and air filters are installed inside of the drive to reduce the contamination levels during operation.

An example of a spindle motor is shown in U.S. Pat. No. 5,694,268 (Dunfield et al.) (incorporated herein by reference). Referring to FIG. 5 of this patent, a stator of the spindle motor is encapsulated with an overmold 42. The overmolded stator 40 contains openings through which mounting pins 44 may be inserted for attaching the stator 200 to a base. U.S. Pat. No. 5,672,972 (Viskochil) (incorporated herein by reference) also discloses a spindle motor having an overmolded stator. One drawback with the stators described in these patents is this difficulty in winding wire on the poles. Another drawback is the height of the lamination stacks. Further, the overmolds shown in these patents are not effective in dissipating heat or dampening some vibrations generated by energizing the stator windings.

U.S. Pat. No. 5,806,169 (Trago) (incorporated herein by reference) discloses a method of fabricating an injection molded motor assembly. However, neither the Trago design nor the other prior art designs address the problems of winding wire, variation in the thickness of steel used to make the stator cores and the non-uniform grain structure in the steel compared to the magnetic flux in the stator during operation of the motor.

Some of these problems have been addressed by motor manufacturing methods in which individual stator arc segments are made and wound with wire to form poles, and these segments are then assembled to form a complete stator. While this process allows for higher packing density, it has several drawbacks. Somehow the individual segments have to be assembled and held in place to form the stator. In addition, the individual wires of the different poles have to be connected together for the poles that are of the same phase. These numerous wires tend to get in the way during the assembly process, slowing down the manufacturing process.

U.S. Pat. No. 6,049,153 to Nishiyama describes the use of crimping or welding to attach segments together. This process deforms the steel and reduces the level of magnetic flux produced by the laminations. The process also requires numerous wire interconnections when the poles are wound as discrete components, and it does not offer improvements in wire routing.

U.S. Pat. No. 5,729,072 to Hirano describes the use of welding or an adhesive to hold the segments together. A disadvantage of this approach is that the stator poles must be handled as separate elements during stator construction. This requires complicated assembly equipment and a slow manufacturing process.

U.S. Pat. No. 6,265,804 to Nitta describes the use of plastic insulation in combination with segmented stators. This approach does not improve on the problem of how to assemble and hold the individual segments in place, nor does it aid in connecting the various wires.

U.S. Pat. No. 6,167,610 to Nakahara describes a method of making a rotary motor where a length of steel strip has thin portions between blocks of pole teeth. Wire is wound on the pole teeth while the steel strip is straight. Later the thin sections are bent to allow the poles to form a stator. One problem with this design is that when the thin portions are bent, the stress on the steel reduces the flux capacity of the connecting steel, forming the back iron. Also, the stamping of such a length of steel strip would be expensive and result in large amount of scrap. Thus, a need exists for a method of making motors overcoming the aforementioned problems.

BRIEF SUMMARY OF THE INVENTION

A method of making stator assemblies has been invented which overcomes many of the foregoing problems. In addition, unique stator assemblies and other components of a motor have been invented. In one aspect, the invention is a stator assembly comprising a plurality of discrete stator segments each at least partially encased with a phase change material, wherein the phase change material also comprises a bridge between adjacent segments to link adjacent segments into a continuous strip; and the linked stator segments being arranged and secured together to form the stator assembly.

In a second aspect, the invention is a combination of stator arc segments and a flexible carrier used to link said stator arc segments during a winding operation comprising: a) a plurality of stator arc segments; and b) a phase change material constituting said flexible carrier adhered to the stator arc segments which links said segments in a uniform and predetermined position with respect to one another.

In another aspect the invention is a method of making a stator assembly comprising: a) providing at least two stator arc segments linked together by a phase change material and each constituting a pole and having a first side surface and a second side surface; b) winding wire on the poles; c) aligning said stator arc segments to form a toroidal core, wherein each said side surface of one segment is in contact with an opposing side surface of another segment; and d) substantially encapsulating said toroidal core with a monolithic body of phase change material to form said stator assembly.

In another aspect the invention is a method of making a stator assembly comprising: a) providing at least two stator arc segments linked together by a phase change material and each providing a pole and having a first side surface and a second side surface; b) winding wire on each pole of each arc segment; c) aligning said stator arc segments to form a toroidal core, wherein each said side surface of one segment is in contact with an opposing side surface of another segment; and d) placing a retaining member on the exterior of the toroidal core to unitize the structure.

In yet another aspect, the invention is a series of discrete stator segments each substantially encapsulated with, and linked together by bridges made from, an injection molded thermoplastic material.

With the unique linked but discrete segment assemblies, wire can be wound around the poles with a high packing density, yet at the same time the segments can be maintained in their proper order so that one continuous piece of wire can be used to wind all poles in the same series or phase, making it unnecessary to later connect wires from individual windings to one another. The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF SEVERAL VIEWS OF THE DRAWINGS

FIG. 3 is a perspective, partial cross-sectional view of an encapsulated stator arc segment of FIG. 2.

FIG. 4 is a perspective view of the encapsulated stator arc segment of FIG. 2.

FIG. 5 is a perspective view of a series of encapsulated stator arc segments of FIGS. 2–4 linked together by a thermoplastic webbing.

DETAILED DESCRIPTION OF THE DRAWINGS AND PREFERRED EMBODIMENTS OF THE INVENTION

Figure 6:
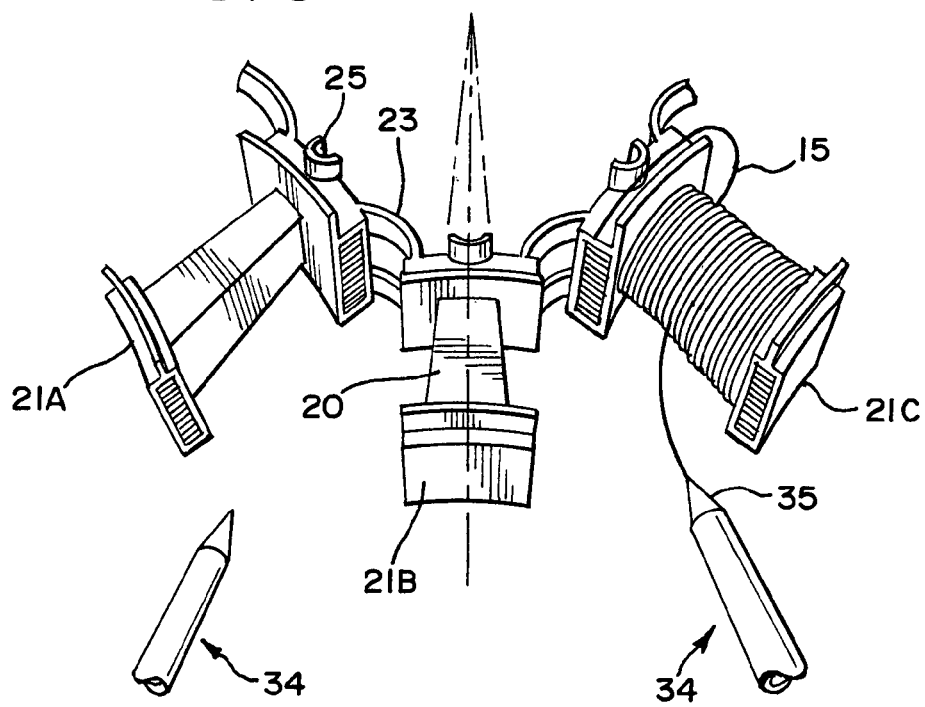
FIG. 6 is a perspective view of the series of stator arc segments of FIG. 5 during wire winding.
Figure 7:
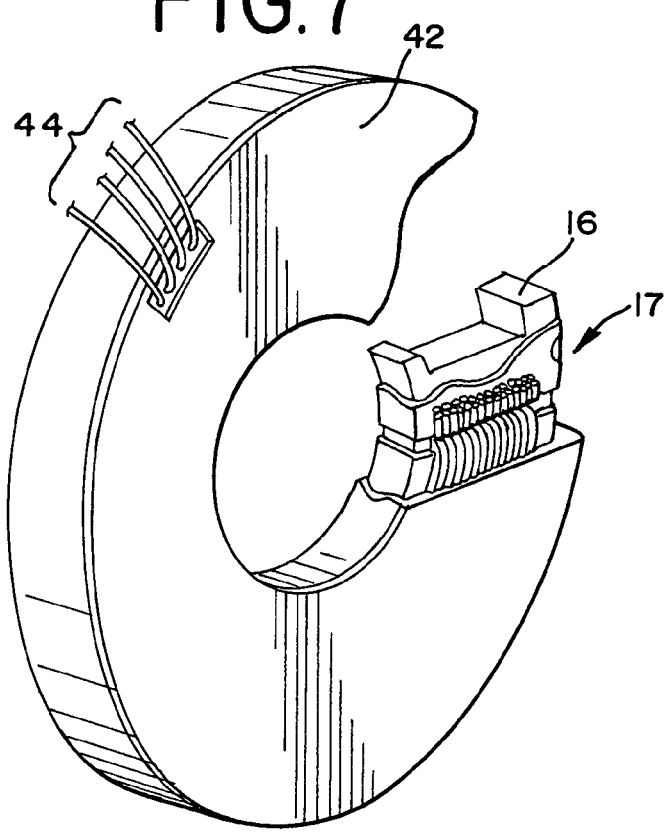
FIG. 7 is a perspective view of an injection molded stator assembly using the linked serial of webbed stator arc segments of FIG. 6.

A preferred embodiment of a motor of the present invention and portions of the motor at different stages of manufacture are shown in FIGS. 2–7 and 9. The spindle motor 100 (FIG. 9) is designed for rotating a disc or stack of discs in a computer hard drive. Motor 100 is formed by using an injection molded stator assembly 40, that is formed by injection molding a plurality of stator arc segments 20 (FIG. 2) aligned to form a toroidal core 17 (FIG. 7). Although the embodiment described here uses individual arc segments, one of ordinary skill in the art will understand that groups of two, three or any greater number of arc segments may be used. The preferred motor of the present invention may be smaller, has a grain structure that is more uniformly aligned, and allows for greater packing density of wire and reduces waste of steel in the manufacturing process, as compared with conventional motors, thereby increasing power and reducing stack up tolerances and manufacturing costs and producing other advantages discussed below.

Figure 1:
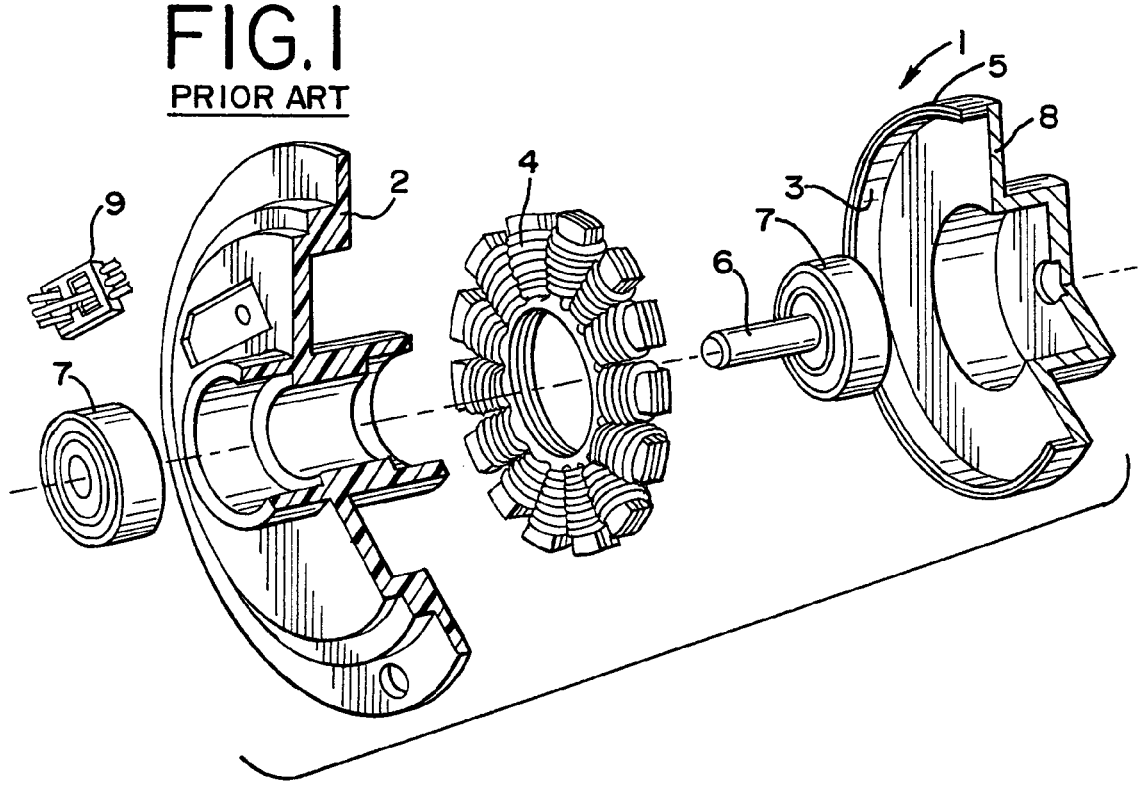
FIG. 1 is an exploded, partial cross-sectional and perspective view of a conventional prior art high speed motor.
Figure 2:
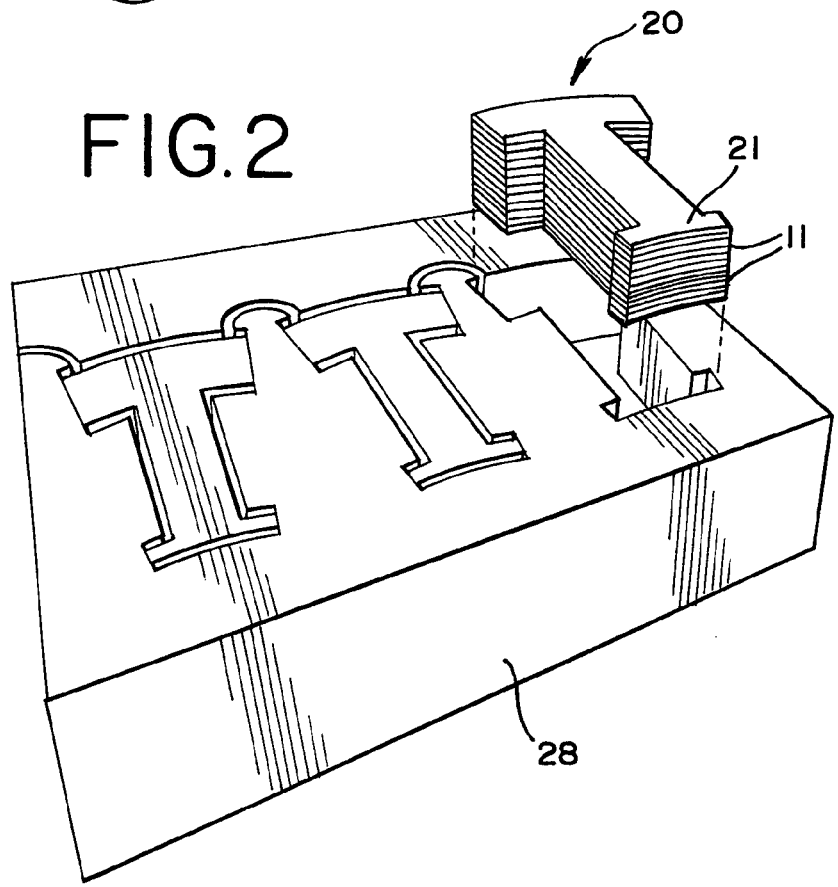
FIG. 2 is perspective view of a stator arc segment being loaded into an injection mold prior to injecting a phase change material to make a limited series of stator arc segments of the present invention.

Referring to FIG. 2, a stator arc segment 20 is first constructed, using steel laminations 11. The stator arc segment 20 is made of steel pieces that are stamped out of rolled steel. The stamped steel pieces are arc segments, but also have a pole 21 extending inwardly or outwardly depending on whether the rotor is inside or surrounds the stator. In the embodiment shown in FIG. 2, the pole 21 is shown extending inwardly. The stamped pieces are then coated with encapsulating material 22 which provides electrical insulation and laminates the pieces together to form a stator arc segment 20, and links other arc segments into a continuous strip via webbing 23.

The encapsulating material 22 is preferably formed of a phase change material, meaning a material that can be used in a liquid phase to envelope the stator, but which later changes to a solid phase. There are two types of phase change materials that will be most useful in practicing the invention: temperature activated and chemically activated. A temperature activated phase change material will become molten at a higher temperature, and then solidify at a lower temperature. However, in order to be practical, the phase change material must be molten at a temperature that is low enough that it can be used to encapsulate a toroidal core. Preferred phase change materials will be changed from a liquid to a solid in the range of about 200° F. to about 700° F., more preferably in the range of about 550° F. to about 650° F. The most preferred temperature activated phase change materials are thermoplastics. The preferred thermoplastic will become molten at a temperature at which it is injection-moldable, and then will be solid at normal operating temperatures for the motor. An example of a phase change material that changes phases due to a chemical reaction, and which could be used to form the body, is an epoxy. Other suitable phase change materials may be classified as thermosetting materials.

As shown in FIG. 2 the segments 20 can be placed in a multi-cavity mold 28 to increase productivity. In the preferred embodiment the individual laminations 11 making up the segments are not interconnected but loosely stacked together before insertion into the mold 28. After the thermoplastic solidifies, the overmolded segments are ejected from their cavities. New laminations are inserted into the cavities and the process repeats. In the preferred embodiment, a continuous strip of segments is formed by linking the webbing from successive molding operation. This is done by designing the tool to insert a section of the plastic webbing of the outermost segment molded in the prior cycle with the new laminations to be molded. When the plastic encapsulates the new segments it can mechanically lock with or, depending upon design, re-melt, the webbing from the prior cycle, thus making a continuous strip, as shown in FIG. 5. The series has segments 20 with poles 21A, 21B and 21C arranged next to one another as they will be in the finished stator assembly.

The stator arc segments 20 are preferably molded into a continuous strip where the webbing acts as a carrier to link the segments together. In the preferred embodiment the encapsulating material 22 forms wire retaining flanges 24 to prevent wire from slipping off the pole. In a preferred embodiment, winding posts 25 as well as webbing 23 allow orientation of wire as it transfers across multiple poles.

By precisely aligning the stator arc segments 20, the webbing 23 can also be used to guide the wire between common phase poles, thus eliminating the need for interconnections commonly used on segmented stator motors. This greatly enhances the efficiency for winding wire 15 around the poles 21 and significantly reduces the cost.

The webbing can be deflected to allow the gap between adjoining poles to be increased as is shown in FIG. 6. This allows wire 15 to be wound around the poles 21 of the stator arc segments 20 using a fly winder 34 that has a set of needles 35. The wire 15 is wound around one pole 21 and is then wound around another pole 21 in its phase until all poles 21 in the same phase are wound with the same wire 15.

Poles 21 in other phases are also similarly wound. Having only arc segments, rather than a full toroidal core, and spreading the spacing between the adjoining segments for needle 35 to wind wire 15 around poles 21, allows a wire packing density of more than 80 percent to be achieved.

A length of connected stator segments 20 corresponding to the number of poles 21 required to produce the motor are cut from the continuous strip. The strip is then rolled into a magnetically inducible toroidal core 17 having a plurality of poles 21 thereon, and wire windings 15 which serve as conductors. To form the toroidal core 17, a side surface 16 of each stator arc segment 20 is aligned and brought into contact with a corresponding side surface of another stator arc segment 20. In certain embodiments where a reduction in eddy currents is desirable, it may be preferable to separate faces 16. This could be done by using a thin film of encapsulation material 22 over the side surfaces 16, or the edges 19 of the insulator end surface (FIG. 4) could be used to create the gap. The wire 15 between the poles 21 of different stator arc segments 20 is also aligned in the toroidal core 17, following the arc of the stator arc segments 20. As a result, the wire in the toroidal core 17 is taught.

As shown in FIG. 7, the toroidal core 17 is then encapsulated in a body 42. Together the toroidal core 17 and the body 42 make up an injection molded stator assembly 40. The body 42 is preferably a monolithic body. Monolithic is defined as being formed as a single piece. The body 42 substantially encapsulates the toroidal core 17. Wires 44 extend out of the body 42 for connection to the power source used to supply the motor. Substantial encapsulation means that the body 42 either entirely surrounds the toroidal core 17, or surrounds almost all of it except for minor areas of the toroidal core 17 that may be exposed. However, substantial encapsulation means that the body 42 and toroidal core 17 are rigidly fixed together, and behave as a single component with respect to harmonic oscillation vibration.

The preferred method of developing the monolithic body 42 comprises designing a phase change material to have a coefficient of linear thermal expansion such that the phase change material contracts and expands at approximately the same rate as the metal laminations of the toroidal core 17. For example, the preferred phase change material should have a CLTE of between 70% and 130% of the CLTE of the core of the stator. The phase change material should have a CLTE that is intermediate the maximum and minimum CLTE of the toroidal core and other motor components where the body is in contact with those other components and they are made of a different material than the core. Also, the CLTE's of the body and toroidal core should match throughout the temperature range of the motor during its operation. An advantage of this method is that a more accurate tolerance may be achieved between the body and the components of the toroidal core because the CLTE of the body matches the CLTE of the toroidal core components more closely. Most often the toroidal core components will be metal, and most frequently steel and copper. Other motor parts are often made of aluminum and steel.

Most thermoplastic materials have a relatively high CLTE. Some thermoplastic materials may have a CLTE at low temperatures that is similar to the CLTE of metal. However, at higher temperatures the CLTE does not match that of the metal. A preferred thermoplastic material will have a CLTE of less than $2 \times 10^{-5}$ in/in/° F., more preferably less than $1.5 \times 10^{-5}$ in/in/° F., throughout the expected operating temperature of the motor, and preferably throughout the range of 0–250° F. Most preferably, the CLTE will be between about $0.8 \times 10^{-5}$ in/in/° F. and about $1.2 \times 10^{-5}$ in/in/° F. throughout the range of 0–250° F. (When the measured CLTE of a material depends on the direction of measurement, the relevant CLTE for purposes of defining the present invention is the CLTE in the direction in which the CLTE is lowest. However, if a material has a rate of expansion in one direction that is more than five times greater than the expansion rate in one of the other directions, then the CLTE for purposes of defining the present invention is average of the CLTEs in each of the three X, Y and Z directions.

The CLTE of common solid parts used in a motor are as follows:

|  | 23° C. | 250° F. |
| --- | --- | --- |
| Steel | 0.5 | 0.8 ($\times 10^{-5}$ in/in/° F.) |
| Aluminum | 0.8 | 1.4 |
| Ceramic | 0.3 | 0.4 |

Of course, if the motor is designed with two or more different solids, such as steel and aluminum components, the CLTE of the phase change material would preferably be one that was intermediate the maximum CLTE and the minimum CLTE of the different solids, such as 0.65 in/in/° F. at room temperature and $1.1 \times 10^{-5}$ in/in/° F. at 250° F.

One preferred thermoplastic material, Konduit OTF-212-11, which includes aluminum oxide as a filler at level of about 55%, was made into a thermoplastic body and tested for its coefficient of linear thermal expansion by a standard ASTM test method. It was found to have a CLTE in the range of –30 to 30° C. of $1.09 \times 10^{-5}$ in/in/° F. in the X direction and $1.26 \times 10^{-5}$ in/in/° F. in both the Y and Z directions, and a CLTE in the range of 100 to 240° C. of $1.28 \times 10^{-5}$ in/in/° F. in the X direction and $3.16 \times 10^{-5}$ in/in/° F. in both the Y and Z directions. (Hence, the relevant CLTEs for purposes of defining the invention are $1.09 \times 10^{-5}$ in/in/° F. and $1.28 \times 10^{-5}$ in/in/° F.) Another similar material, Konduit PDX-0-988, was found to have a CLTE in the range of –30 to 30° C. of $1.1 \times 10^{-5}$ in/in/° F. in the X direction and $1.46 \times 10^{-5}$ in/in/° F. in both the Y and Z directions, and a CLTE in the range of 100 to 240° C. of $1.16 \times 10^{-5}$ in/in/° F. in the X direction and $3.4 \times 10^{-5}$ in/in/° F. in both the Y and Z directions. By contrast, a PPS type polymer, (Fortron 4665) was likewise tested. While it had a low CLTE in the range of –30 to 30° C. ($1.05 \times 10^{-5}$ in/in/° F. in the X direction and $1.33 \times 10^{-5}$ in/in/° F. in both the Y and Z directions), it had a much higher CLTE in the range of 100 to 240° C. ($1.94 \times 10^{-5}$ in/in/° F. in the X direction and $4.17 \times 10^{-5}$ in/in/° F. in both the Y and Z directions).

In addition to having a desirable CLTE, the preferred phase change material will also have a high thermal conductivity. A preferred thermoplastic material will have a thermal conductivity of at least 0.4 watts/meter° K. using ASTM test procedure 0149 and tested at room temperature (23° C.).

In the present embodiment, the phase change material used to make the body 42 is preferably a thermally conductive but non-electrically conductive plastic. In addition, the plastic preferably includes ceramic filler particles such as aluminum oxide or boron nitride that enhance the thermal conductivity, while reducing the coefficient of linear thermal expansion of the plastic. The filler will preferably comprise about 30% or more of the phase change material, more preferably about 45% or more, and most preferably about 55% or more. A preferred form of plastic is polyphenyl sulfide (PPS) sold under the tradename "Konduit" by LNP.

Grade OTF-212-11 PPS is particularly preferred, using a roughly 55 weight percentage of aluminum oxide as a filler. Examples of other suitable thermoplastic resins include, but are not limited to, thermoplastic resins such as 6,6-polyamide, 6-polyamide, 4,6-polyamide, 12,12-polyamide, 6,12-polyamide, and polyamides containing aromatic monomers, polybutylene terephthalate, polyethylene terephthalate, polyethylene napththalate, polybutylene napththalate, aromatic polyesters, liquid crystal polymers, polycyclohexane dimethylol terephthalate, copolyetheresters, polyphenylene sulfide, polyacylics, polypropylene, polyethylene, polyacetals, polymethylpentene, polyetherimides, polycarbonate, polysulfone, polyethersulfone, polyphenylene oxide, polystyrene, styrene copolymer, mixtures and graft copolymers of styrene and rubber, and glass reinforced or impact modified versions of such resins. Blends of these resins such as polyphenylene oxide and polyamide blends, and polycarbonate and polybutylene terephthalate, may also be used in this invention.

Of course, two different phase change materials can be used for the encapsulating material 22 and the body 42. The encapsulating material 22 will normally be a really stiff, high temperature thermoplastic, whereas, the body 42 will normally be made of a more compliant thermoplastic.

Figure 8A:
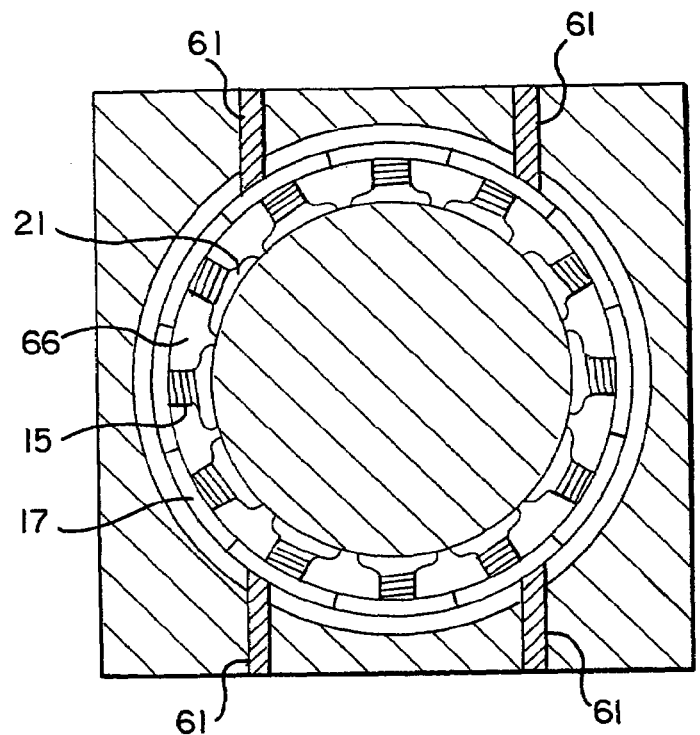
FIG. 8a is a cross-sectional view of a toroidal core made from the linked series of stator arc segments after the wire winding shown in FIG. 5 in an injection mold assembly, prior to injecting a phase change material.
Figure 8B:
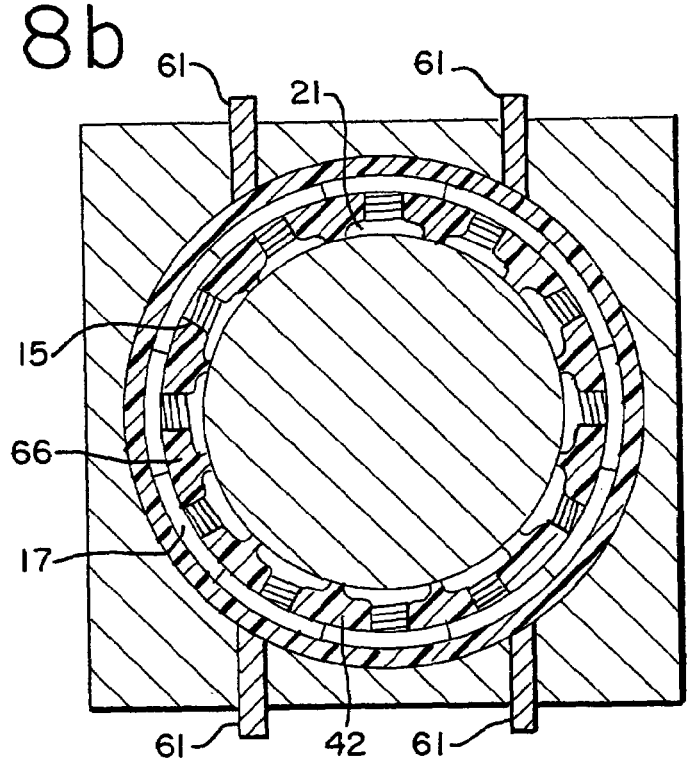
FIG. 8b is a cross-sectional view of the toroidal core of FIG. 8a in an injection mold assembly after injecting a phase change material, resulting in the stator assembly of FIG. 7.

As shown in FIG. 8a, to encapsulate the toroidal core 17 and form body 42, the series of stator arc segments with windings already applied is first clamped and held in place by pins 61 in an injection mold cavity 66. The injection mold cavity 66 is very effective and maintains the toroidal shape of the segments during molding. It is likely that more than the four pins 61 shown in FIG. 8a will be needed to do this. Molten phase-change material is then injected into the molding cavity 66 with an extrusion screw (not shown) until the pressure inside the cavity reaches a predetermined molding pressure. After injecting the molten phase change material, the pins 61 retract as shown in FIG. 8b, and the phase change material fills in the area vacated as the pins retract. The phase change material is then allowed to cool and solidify into a monolithic body 42 that substantially encapsulates the toroidal core 17. The preferred thickness of the body 42 depends on the aspect ratio of the toroidal core 17. Preferably the injection molding operation is controlled in the manner described in U.S. patent application Ser. No. 09/983,002, filed Oct. 17, 2001, which is hereby incorporated by reference in its entirety.

Figure 9:
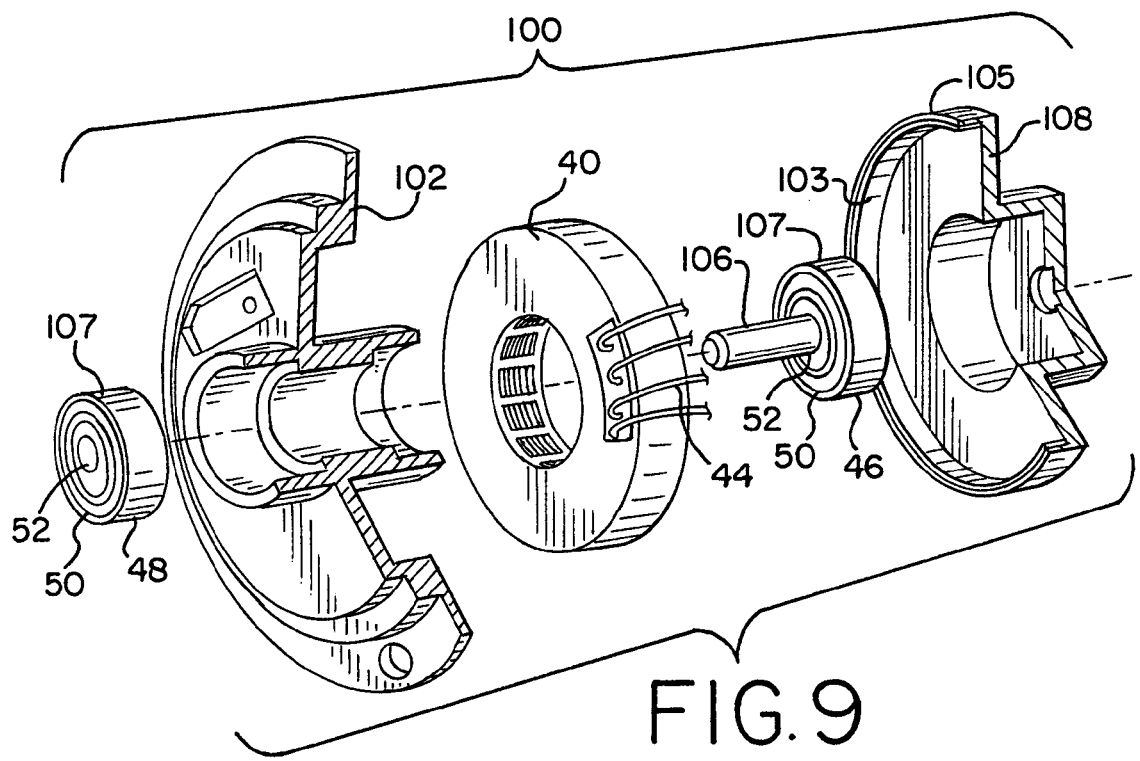
FIG. 9 is an exploded, partial cross-sectional and perspective view of a motor using the encapsulated webbed stator of FIG. 7.

The injection molded stator assembly 40 is then used to construct the rest of the motor 100 (FIG. 9). The motor 100 includes a hub 108, which serves as a disc support member, the stator assembly 40, a base 102, a shaft 106 and bearings 107.

As shown in FIG. 9, a shaft 106 is connected to the hub or disc support member 108 and is surrounded by bearings 107, which are adjacent against the base 102 of the motor. A rotor or magnet 103 is fixed to the inside of the hub 108 on a flange so as to be in operable proximity to the stator assembly. The magnet 103 is preferably a permanent magnet, as described below.

Referring to FIG. 9, the bearings 107 include an upper bearing 46 and a lower bearing 48. Also, each bearing 107 has an outer surface 50 and an inner surface 52. The outer surface 50 of the upper bearing 46 contacts the hub 108 and the outer surface 50 of the lower bearing 48 contacts the support base 102. The inner surfaces 52 of the bearings 46 and 48 contact the shaft 106. The bearings are preferably annular shaped. The inner surfaces 52 of the bearings 107 may be press fit onto the shaft 106. A glue may also be used. The outer surface 50 of the bearings 107 may be press fit into the interior portion of the base 102. A glue may also be used. The bearings in the embodiment shown in FIG. 9 are ball bearings. Alternatively other types of bearings, such as hydrodynamic or combinations of hydrodynamic and magnetic bearings, may be used. The bearings are typically made of stainless steel.

The shaft 106 is concentrically disposed within the interior portion of the stator assembly 40 and the base 102. The bearings 107 surround portions of the shaft 106. As described above, the inner surfaces 52 of the bearings are in contact with the shaft 106. The shaft 106 includes a top portion and a bottom portion. The top portion of the shaft 106 is fixed to the hub 108. The bottom portion of the shaft 106 is free to rotate inside the lower bearing. Thus, in this embodiment, the shaft 106 is freely rotatable relative to the base 102. The shaft 106 is preferably cylindrical shaped. The shaft 106 may be made of stainless steel.

Referring to FIG. 9, the hub 108 is concentrically disposed around the stator assembly 40 and the base 102. The hub 108 is fixed to the shaft 106 and is spaced apart from the stator assembly 40 and the base 102. The hub 108 includes a flux return ring 105 and the magnet 103. The flux return ring 105 and magnet 103 are glued to the hub 108. As shown in FIG. 9, the magnet 103 concentrically surrounds the stator assembly 40. In this embodiment the magnet 103 and stator assembly 40 are generally coplanar when the motor 100 is assembled.

The magnet 103 is preferably a sintered part and is one solid piece. The magnet 103 is placed in a magnetizer which puts a plurality of discrete North and South poles onto the magnet 103, dependant on the number of poles 21 on the toroidal core 17. The flux return ring 105 is preferably made of a magnetic steel. The hub is preferably made of aluminum. Also, the hub may be made of a magnetic material to replace the flux return ring. Other motor designs using an encapsulated stator that can be made by the present invention are disclosed in U.S. patent application Ser. No. 09/470,434, filed Dec. 22, 1999, and U.S. Pat. No. 6,501,616, both of which are incorporated herein by reference.

Figure 10:
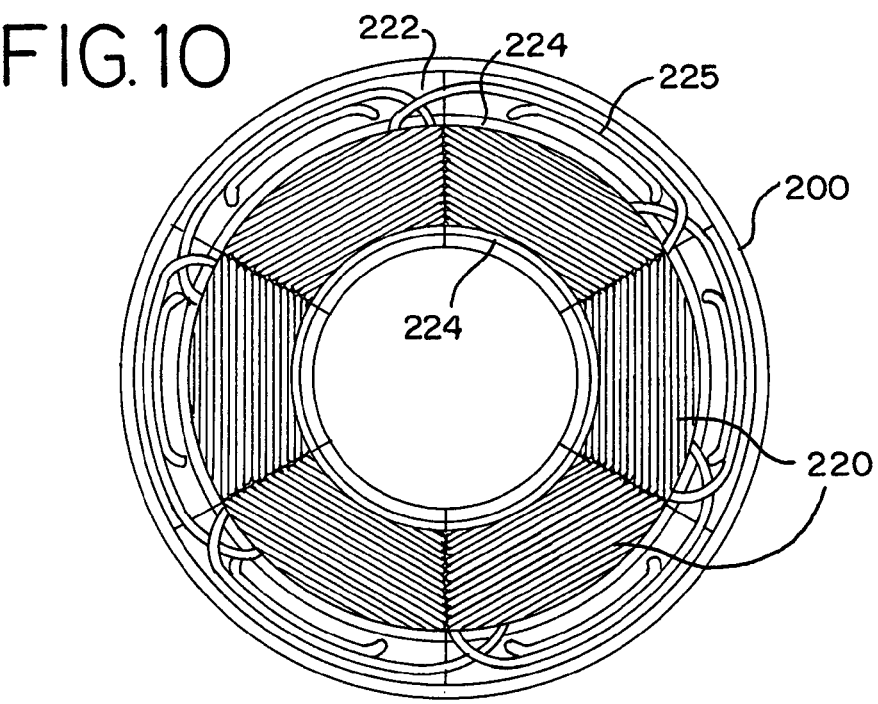
FIG. 10 is a perspective view of a stator assembly of a second embodiment of the present invention using a steel band to unitize the webbed stator arc segments.

Although the embodiment described here uses encapsulation of the segments 20 used to form a stator assembly, one of ordinary skill in the art will understand that other methods of unitizing the structure may be used. One example, as shown in FIG. 10, is the use of a steel collar 200 to fixture the discrete stator segments 220, six of which are used in this embodiment. This process, commonly referred to as "hot banding," requires heating the steel collar 200 to a temperature above the stator temperature. Via thermal expansion the collar grows larger than the toroidal core diameter so that it can be placed around the circumference of the core. As the collar cools, its diameter reduces, creating an interference force on the segments effectively unitizing the structure. The segments 220 are similar to stator segments 20, each encapsulated in a thermoplastic material 222 and having retaining flanges 224 and winding posts 225 for holding wire.

Advantages of the Present invention

An advantageous feature of the preferred embodiment is provided by the fact that the stator assembly 40 is formed from stator arc segments 20 that are aligned to form a toroidal core 17 and substantially encapsulated with a monolithic body 42 to form a stator assembly 40. Using stator arc segments 20 provides a more uniform grain structure to the toroidal core 17. The grain orientation of prior art circular stampings varies a great deal at different points around the circle. By using arc segments, a more uniform grain structure may be obtained. The grain orientation has an effect on the magnetic flux properties of the steel. By making all the arc segments have the same orientation compared to the grain structure of the steel from which they are stamped, the grain structure in the core is more uniform and the magnetic flux is more uniform and the motor 100 of the present invention has more consistent and uniform torque properties as it rotates. This also leads to greater motor efficiency and performance.

The ability to manipulate the webbing to separate the pole faces allows for a smaller slot gap than can be traditionally employed with needle wound motors. This reduction in slot gap can be used to reduce cogging torque as well as reduce wind noise and associated vibration. Additionally, the ability to wind each phase with a continuous strip of wire, as opposed to winding distinct poles and then connecting terminal ends of the windings as is presently done with other segmented stators, offers a compelling cost savings.

The preferred motor also has greater packing density of wire 15. In the disclosed embodiment of the invention, the toroidal core 17 is made of sections, one for each pole 21. It should be understood that the disclosed method can use any number of stator arc segments 20 greater than at least two. With prior art circular stamped stators, there is a limitation of the spacing between each pole 21 to allow the needle 35 feeding the winding wire 15 to enter and exit the gap. Additionally, in traditional small motors (less than 1.5 inches outer diameter), it is difficult to wind three phases of wire concurrently. Furthermore, this geometry makes the process of applying uniform, evenly spaced turns difficult to achieve. With the present invention, since the faces of the poles can be separated, there is more room to work, and a needle 35 feeding the winding wire 15 can thus pack the windings more tightly. The webbing 23 allows easier packaging and transportation of the poles and also allows for the winding to be done more efficiently. Increasing the packing density of wire 15 increases the magnetic field, thereby providing more electromotive force and increased power to the motor 100.

The limited working space for winding wire 15 around the poles 21 in circular stamped stators limits the size of motors as well. Since the disclosed method allows for increased working room, smaller motors may be made with the present method compared to prior art methods. The use of flanges 24 and posts 25 molded onto the segments can be used to keep the wire organized around the perimeter of the assembly while it is being overmolded.

The disclosed spindle motor 100 minimizes stack up tolerances. Since in the present embodiment only single poles are being used, the laminations can be stamped from portions of the steel roll that has a more consistent thickness. Thus, the resulting stacked stator arc segment 20 will have reduced stack up tolerances. Reducing the stack up tolerances optimizes dimensional consistency and thereby enables higher rotational speeds with lower vibration induced runout. Furthermore, since arc segments are used instead of circular stampings, they can be more closely laid out when being stamped, reducing the amount of resulting scrap.

Further, in the prior art, to prevent a motor from seizing when it gets hot, larger than desired gaps between the magnet 3 and the stator assembly 4 were used so that when pieces expanded from being heated, the magnet would not contact the stator. If the magnet contacted the stator, the contact would generate magnetic particulate which can damage the read/write heads in a hard disc drive incorporating the motor, and interfere with their ability to read or record data on the discs. Also, if the body has a CLTE greater than that of the steel laminations in the stator, the gap has to be large enough so that the expansion of the body as the motor heats up does not cause the body to contact the rotating magnet (even though the steel laminations are not close to contacting the magnet). With the preferred embodiment of the present invention, with the CLTE of the body matching that of the steel laminations, much smaller gaps, as low as 0.005 inches, and more preferably as low as 0.003 inches, can be utilized. As the body 42 expands, it only expands at the same rate as the laminations, and does not grow to the point that the body 42 diminishes the gap size to zero. Thus, the only gap that is needed is one sufficient for expansion of the steel laminations. These smaller gaps make the motor 100 more efficient, as the electrical efficiency of the motor decreases with larger distances between the stator and the rotating magnet.

Through the use of the present embodiment, a particular plastic may be chosen for the body 42 that has properties of Rockwell hardness, flex modulus, and elongation that are specifically designed to counteract the vibratory frequencies generated by the motor 100. Thus, the disclosed spindle motor 100 substantially reduces motor vibration. This reduced vibration allows information on a disc to be stored closer together, thereby enabling higher data density.

The preferred embodiment of the invention has numerous advantages compared to the prior art. The length of the connected segments of the present invention can be any length desired, and in fact can be hundreds of feet long and supplied from large rolls that are cut to length while making motors. At the same time, the individual poles can be easily handled and oriented with respect to one another.

The encapsulating material 22 naturally provides insulation between the wire and the laminations, thus alleviating any concern that nicks in the enamel coating on the wire can cause a short. The windings on poles that will be in phase do not need to be connected to one another in a second operation after the winding step, as a continuous length of wire for each phase is used. There is good heat transfer between the wire and the steel laminations, and hence to the external portion of the motor, so that it can be dissipated easily.

It is contemplated that numerous modifications may be made to the motor and method for making the motor of the present invention without departing from the spirit and scope of the invention as defined in the claims. For example, the arc segments 20 need not be formed of laminations. While the exemplary embodiment shown in the drawings has twelve stator arc segments 20, those skilled in the art will appreciate that the same method can be used to make stator assemblies with two stator arc segments or any number greater than two. While the segments 20 are encapsulated by injection molding the phase change material around the laminations 11, the segments 20 could be encased in other ways with a bridging material. Additional components such as enhancement magnets or flux shields can be encapsulated in the plastic 22 during the overmolding of the steel laminations 11. Furthermore, the body 42 can encapsulate more than just the toroidal core. The body 42 can also encapsulate or form the base 102 of the motor without departing from the scope of the invention. Accordingly, while the present invention has been described herein in relation to several embodiments, the foregoing disclosure is not intended or to be construed to limit the present invention or otherwise to exclude any such other embodiments, arrangements, variations, or modifications and equivalent arrangements. Rather, the present invention is limited only by the claims appended hereto and the equivalents thereof.

The invention claimed is:

1. A stator assembly, comprising:
   a) a plurality of discrete stator segments each at least partially encased with a phase change material, wherein the phase change material also comprises a bridge between adjacent segments to link adjacent segments into a continuous strip; and
   b) the linked stator segments being arranged and secured together to form the stator assembly, wherein the stator segments are held in a toroidal shape by a retaining member which comprises a metal band.

2. The stator assembly of claim 1 wherein the bridges produce such a continuous linkage between segments that the bridges may be used to orient and manipulate the segments during wire winding.

3. The stator assembly of claim 1 wherein wire having a packing density of greater than 80 percent is wound around the poles.

4. The stator assembly of claim 1 wherein the bridges between adjoining segments can be used to orient and position wire relative to the poles.

5. The stator assembly of claim 1 wherein the phase change material has a thermal conductivity of at least 0.4 watts/meter° K at 23° C.

6. The stator assembly of claim 1 wherein the discrete stator segments are each made from a plurality of steel laminations.

7. The stator assembly of claim 1 wherein the phase change material comprises polyamide.

8. A motor made from the stator assembly of claim 1.

9. The stator assembly of claim 1 wherein the bridge is formed by interconnecting two mating sections formed from the phase change material.

10. A stator assembly, comprising:
    a) a plurality of discrete stator segments each at least partially encased with a phase change material, wherein the phase change material also comprises a bridge between adjacent segments to link adjacent segments into a continuous strip, wherein the bridge is formed by interconnecting two mating sections formed from the phase change material; and
    b) the linked stator segments being arranged and secured together to form the stator assembly.

11. The stator assembly of claim 10 wherein the stator segments are held in a toroidal shape by an overmolded thermoplastic material.

12. The stator assembly of claim 10 wherein the stator segments are held in a toroidal shape by a retaining member.

13. The stator assembly of claim 12 wherein retaining member comprises a metal band.

14. A combination of stator arc segments and a flexible carrier used to link said stator arc segments during a winding operation comprising:
    a) a plurality of stator arc segments; and
    b) a phase change material constituting said flexible carrier adhered to the stator arc segments which links said segments in a uniform and predetermined position with respect to one another; wherein the flexible carrier links said segments by connecting two mating sections formed in said carrier.

* * * * *